United States Patent
Forutanpour et al.

(10) Patent No.: US 9,417,329 B2
(45) Date of Patent: Aug. 16, 2016

(54) USER EXPERIENCE OF THE CONNECTED AUTOMOBILE

(75) Inventors: Babak Forutanpour, San Diego, CA (US); Jeffrey D. Beckley, San Diego, CA (US); Shivakumar Balasubramanyam, San Diego, CA (US); Martin Renschler, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 151 days.

(21) Appl. No.: 13/423,462

(22) Filed: Mar. 19, 2012

(65) Prior Publication Data
US 2013/0245884 A1 Sep. 19, 2013

(51) Int. Cl.
*G06F 17/00* (2006.01)
*G01S 19/34* (2010.01)
*G01S 19/51* (2010.01)

(52) U.S. Cl.
CPC *G01S 19/34* (2013.01); *G01S 19/51* (2013.01)

(58) Field of Classification Search
None
See application file for complete search history.

(56) References Cited

U.S. PATENT DOCUMENTS

| | | | |
|---|---|---|---|
| 6,111,521 A * | 8/2000 | Mulder et al. | 340/905 |
| 6,611,742 B1 * | 8/2003 | Sand et al. | 701/36 |
| 7,372,818 B2 | 5/2008 | Fraser et al. | |
| 8,000,842 B2 | 8/2011 | Yi et al. | |
| 9,224,297 B2 * | 12/2015 | Shaffer | G08G 1/14 |
| 2006/0106806 A1 * | 5/2006 | Sperling et al. | 707/10 |
| 2010/0222939 A1 * | 9/2010 | Namburu et al. | 701/2 |
| 2010/0280687 A1 * | 11/2010 | Tate et al. | 701/22 |
| 2011/0148658 A1 | 6/2011 | Murray et al. | |
| 2011/0187513 A1 | 8/2011 | Taki et al. | |
| 2012/0316768 A1 * | 12/2012 | Haran | 701/300 |
| 2013/0103300 A1 * | 4/2013 | Rakthanmanon et al. | 701/408 |
| 2013/0176147 A1 * | 7/2013 | Anderson et al. | 340/932.2 |

FOREIGN PATENT DOCUMENTS

| | | |
|---|---|---|
| CN | 101334290 A | 12/2008 |
| CN | 101920702 A | 12/2010 |
| CN | 102037330 A | 4/2011 |
| JP | 2005132131 A | 5/2005 |
| JP | 2011053954 A * | 3/2011 |

OTHER PUBLICATIONS

International Search Report and Written Opinion—PCT/US2013/032865—ISA/EPO—May 21, 2013.

* cited by examiner

*Primary Examiner* — Helal A Algahaim
*Assistant Examiner* — Paul Castro
(74) *Attorney, Agent, or Firm* — Brian Momeyer

(57) ABSTRACT

A method, an apparatus, and a computer program product for initiating at least one process in a vehicle are provided. The apparatus determines an approximate position of the vehicle. In addition, the apparatus determines a shortest time period based on the determined approximate position in which one or more registered drivers of the vehicle is in proximity to the vehicle. Furthermore, the apparatus determines whether to initiate the at least one process within the vehicle based on the determined time period.

78 Claims, 13 Drawing Sheets

User-Approach Process — 401

| Process | Preference |
|---|---|
| Heating/Cooling Cabin | 60° / 80° |
| Lower/Raise Window | Halfway |
| Lock/Unlock Door | 1 Min |
| Turn On/Off Lights | 1 Min |
| Heat/Cool Battery | 10 Min |
| Starting Engine/Motor | 1 Min |

Selected Process — 402

| Process | Time | Schedule 405 |
|---|---|---|
| System Update Options | | |
| Incremental Update | 5 HR | X |
| Full Update | 10 HR | X |
| Battery Charge Options | | |
| Slow Charge | 6 HR | X |
| Fast Charge | 4 HR | X |

— 407

Miscellaneous Process — 403

| Process | Time | Schedule |
|---|---|---|
| Firmware Update | 1 HR | once a week |
| GPS Update | 2 HR | X |
| Software Patch | 1 HR | X |
| Security Update | 2 HR | X |
| Defragmentation | 5 HR | every day |
| Download Data | 1 HR | X |
| Upload Data | 1.4 HR | X |
| System Test | 2.3 HR | X |

FIG. 4

USER EXPERIENCE OF THE CONNECTED AUTOMOBILE

BACKGROUND

1. Field

The present disclosure relates generally to automated control systems, and more particularly to a vehicle control system.

2. Background

Vehicles have incorporated more electronic systems such as alarm systems, onboard modems, music entertainment systems, navigation systems, etc. The batteries used to power these electronic systems have been strained due to the demands of the electronic systems. In addition to the power demands, these electronic systems have time demands for updates and maintenance. A need exists to improve the user experience for the connected automobile in relation to updates, maintenance, and power.

SUMMARY

In an aspect of the disclosure, a method, a computer program product, and an apparatus are provided. The apparatus determines an approximate position of the vehicle. In addition, the apparatus determines a shortest time period based on the determined approximate position in which a registered driver of the vehicle is in proximity to the vehicle. Furthermore, the apparatus determines whether to initiate the at least one process within the vehicle based on the determined time period.

BRIEF DESCRIPTION OF THE DRAWINGS

FIG. 4 illustrates different types of processes.

DETAILED DESCRIPTION

Figure 1:
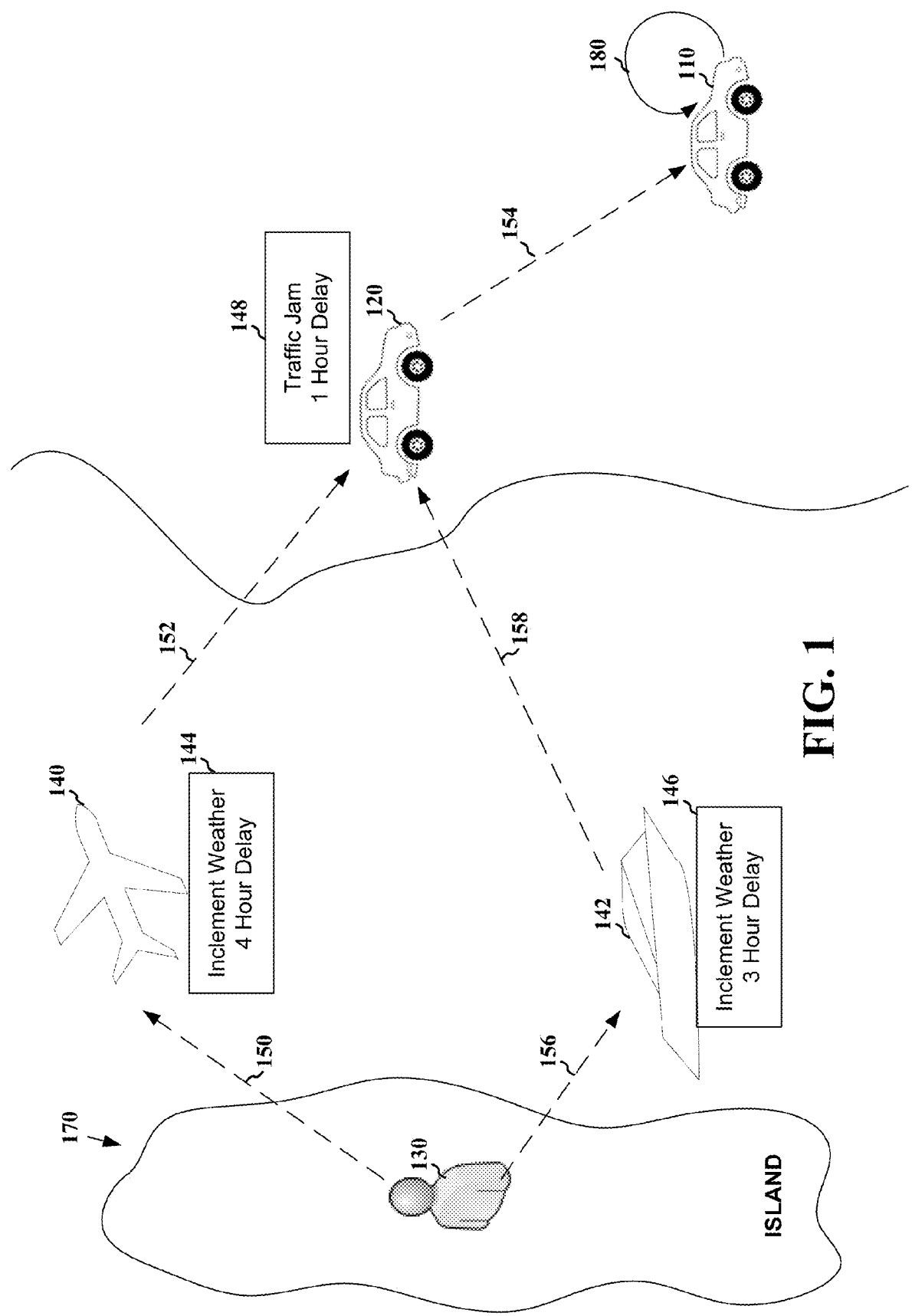
FIG. 1 illustrates a time of travel for a registered driver to reach a vehicle.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Several aspects of control systems will now be presented with reference to various apparatus and methods. These apparatus and methods will be described in the following detailed description and illustrated in the accompanying drawings by various blocks, modules, components, circuits, steps, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented with a "processing system" that includes one or more processors. Examples of processors include microprocessors, microcontrollers, digital signal processors (DSPs), field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise.

Accordingly, in one or more exemplary embodiments, the functions described may be implemented in hardware, software, firmware, or any combination thereof. If implemented in software, the functions may be stored on or encoded as one or more instructions or code on a computer-readable medium. Computer-readable media include computer storage media. Storage media may be any available media that can be accessed by a computer. By way of example, and not limitation, such computer-readable media may comprise RAM, ROM, EEPROM, CD-ROM or other optical disk storage, electronic disk storage, magnetic disk storage, or other magnetic storage devices, or any other medium that can be used to carry or store desired program code in the form of instructions or data structures that can be accessed by a computer. Disk and disc, as used herein, include compact disc (CD), laser disc, optical disc, digital versatile disc (DVD), floppy disk and Blu-ray disc where disks usually reproduce data magnetically, while discs reproduce data optically with lasers. Combinations of the above should also be included within the scope of computer-readable media.

FIG. 1 illustrates a time of travel for a registered driver to reach a vehicle. The vehicle 110 may determine an approximate position of the vehicle 110. Next, the vehicle 110 determines a shortest time period in which the registered driver 130 of the vehicle 110 is in proximity to the vehicle 110. The vehicle 110 may use the shortest time period to determine whether to initiate at least one process 180. In the example shown in FIG. 1, the vehicle 110 may be associated with the registered driver 130 registered as an owner of the vehicle 110. As shown, the registered driver 130 is located at a remote location 170, such as an island, away from the vehicle 110.

For the registered driver 130 to reach the vehicle 110, the registered driver 130 may use any number of modes of travel, including travel by sea, air, and land. For example, the registered driver 130 may travel by public transportation, walking, bicycling, or other transportation methods. The time of travel may include multiple routes of travel such as a travel by air 140 route 152 and travel by land 120 route 154, or travel by sea 142 route 158 and travel by land 120 route 154. Various modes of travel may have different travel times and inherent travel delays. In the example shown in FIG. 1, the registered driver 130 may travel by air 140 or sea 142 to reach the vehicle 110. For travel by air 140, the registered driver 130 may require additional travel means and delays, such as a route 150 to an airport to board the airplane. For travel by sea 142, the registered driver 130 may require another route 156 to a ferry to board an ocean vessel. Inherent travel delays for travel by air 140 may include delays at the airport, screening checks, customs checks, etc. Weather may also contribute to inherent delays. Inherent delays for travel by sea 142 may include delays at the ferry and weather delays. In FIG. 1, travel by air 140 may require seven hours plus four hours for weather delays 144 for eleven hours total air travel, while travel by sea 142 may require ten hours plus three hours for weather delays 146 for thirteen hours total sea travel. Even though travel by air 140 has a longer inherent delay, the total air travel time is shorter than the total sea travel time. A second segment of travel includes a travel by land 120 route 154 for the registered driver 130 to reach the land 120. Travel by land 120 may also include inherent delays such as traffic delays 148. Traffic delays 148 may include an hour of traffic jam. The travel time may be affected by a time of day. During the day time, more travel models may be available, but certain types of delays may be more common. For example, traffic delays during rush hour may be common during the day time, whereas slower speed limits may be common during the night time. Travel time may be affected by the time of day in other ways, including the registered driver's availability to travel. For example, the registered driver 130 may sleep during the night time and be unavailable for travel.

In the example shown in FIG. 1, the shortest time period in which the registered driver 130 is in proximity to the vehicle 110 may be twenty hours through route 150, 152, and 154. The vehicle may use the determined shortest time period to determine whether to initiate at least one process 180 such that the at least one process 180 is completed before the registered driver 130 reaches the vehicle 110. For example, the vehicle may have a software update process that requires nine hours, a data synchronization process that requires twelve hours, and a system self-check that requires twenty one hours. In one aspect, the vehicle may determine that the three processes may be performed in parallel (e.g., simultaneously). The vehicle may determine to initiate the software update process and data synchronization process because both processes may be performed simultaneously and will complete before the registered driver 130 reaches the vehicle 110. The vehicle 110 may determine not to perform the system self-check, even when the processes are performed in parallel, because the system self-check will not complete before the registered driver 130 reaches the vehicle 110. In another aspect, the vehicle 110 may determine that the three processes must be performed in series (e.g., one followed by another). Consequently, the vehicle 110 may determine to initiate only one of the software update process or the data synchronization process and may determine not to perform the system self-check because the system self check will not complete before the registered driver 130 reaches the vehicle.

Figure 2:
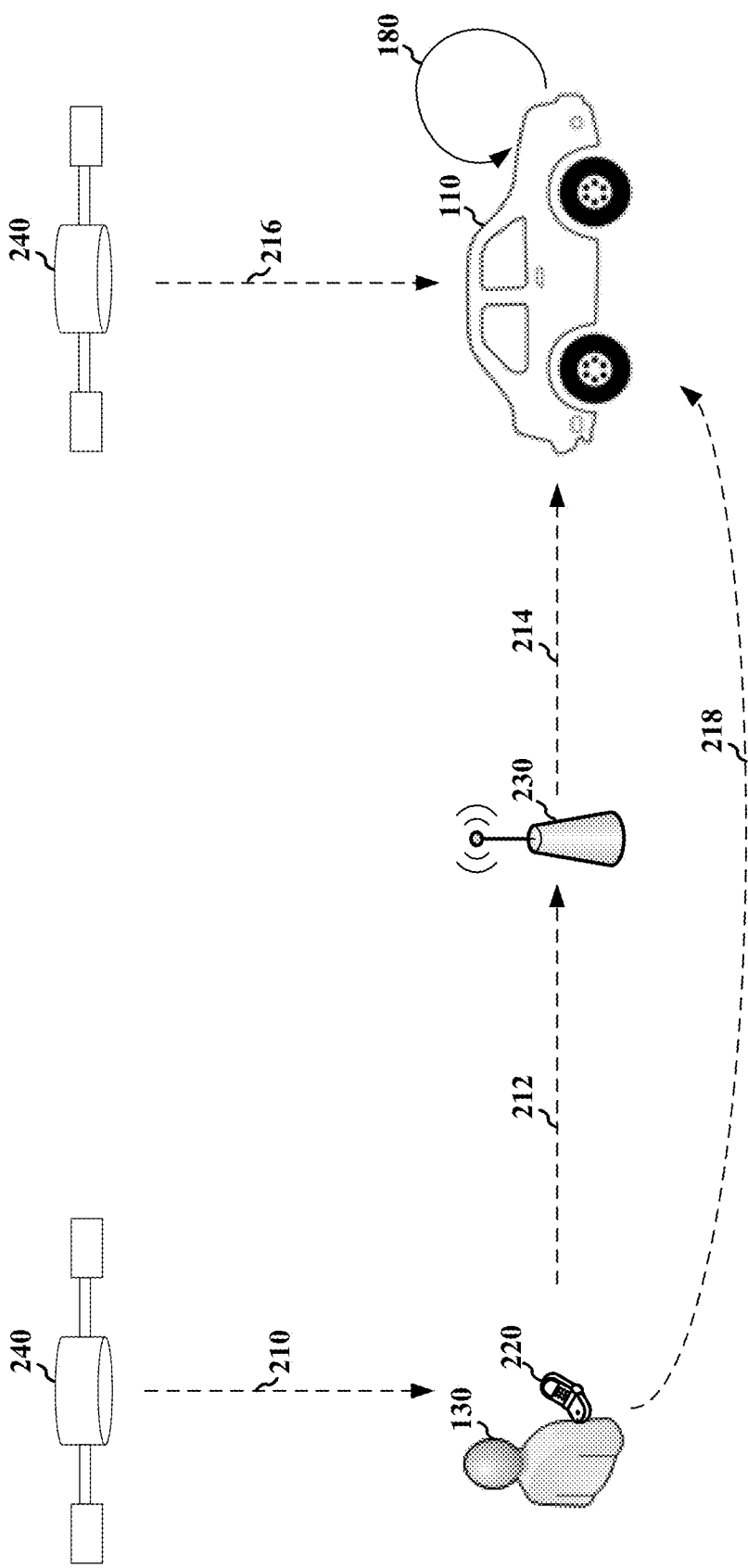
FIG. 2 illustrates the vehicle receiving location information.

FIG. 2 illustrates the vehicle receiving location information. The vehicle 110 may determine its approximate position and the position of the registered driver 130 for use in determining whether to initiate the at least one process 180. In the example of FIG. 2, the vehicle 110 may receive location information 216 for its own location and for the location of the registered driver 130. For example, the vehicle 110 may determine its own location using global positioning system (GPS) location information 216 from GPS satellites 240. The registered driver 130 may determine location information 210 using a mobile device 220. Location information 210 may be provided, for example, through GPS satellites 240. Other methods of determining location are possible. By way of example, the mobile device 220 may receive location information through land based access points, and determine location by proximity to nearby access points or through triangulation of multiple access points. After the mobile device 220 has determined its location information, the mobile device 220 may transmit the location information 212 to the access point 230. In another embodiment, the mobile device 220 may transmit a signal not including location information to the access point 230, and the access point 230 determines an approximate location of the mobile device 220. The access point 230 may transmit the registered driver's 130 location information 214 to the vehicle 110. The vehicle 110 may determine the shortest time period in which the registered driver 130 is in proximity to the vehicle 110 based on the received registered driver's 130 location information and the vehicle's own location information. The shortest time period may be determined based on the location information, for example, as described in FIG. 1.

In one configuration, the vehicle 110 may determine whether the registered driver 130 is in proximity to the vehicle 110 through a signal 218 received from the registered driver 130. For example, the vehicle 110 may overhear a signal (e.g., signal sent on uplink to a serving base station, Bluetooth signal, WiFi signal) or receive a dedicated signal (i.e., a signal transmitted specifically to the vehicle 110) transmitted from the mobile device 220 carried by the registered driver 130. Based on the type of signal received, the vehicle 110 may determine a potential range of the registered driver 130 from the vehicle 110. The vehicle 110 may determine the proximity of the registered driver 130 through other means, such as visual detection. For example, a camera coupled to the vehicle 110 may capture an image of the registered driver 130, and through facial recognition, the vehicle 110 may determine that the registered driver 130 is in proximity. The camera need not be coupled to the vehicle 110. For example, the vehicle may monitor images captured by a camera with a known position and uploaded to the Internet. If the vehicle 110 determines that the registered driver 130 is in any of those images, based on the known position of the camera, the vehicle 110 may be able to determine the proximity of the registered driver 130 to the vehicle 110.

Figure 3:
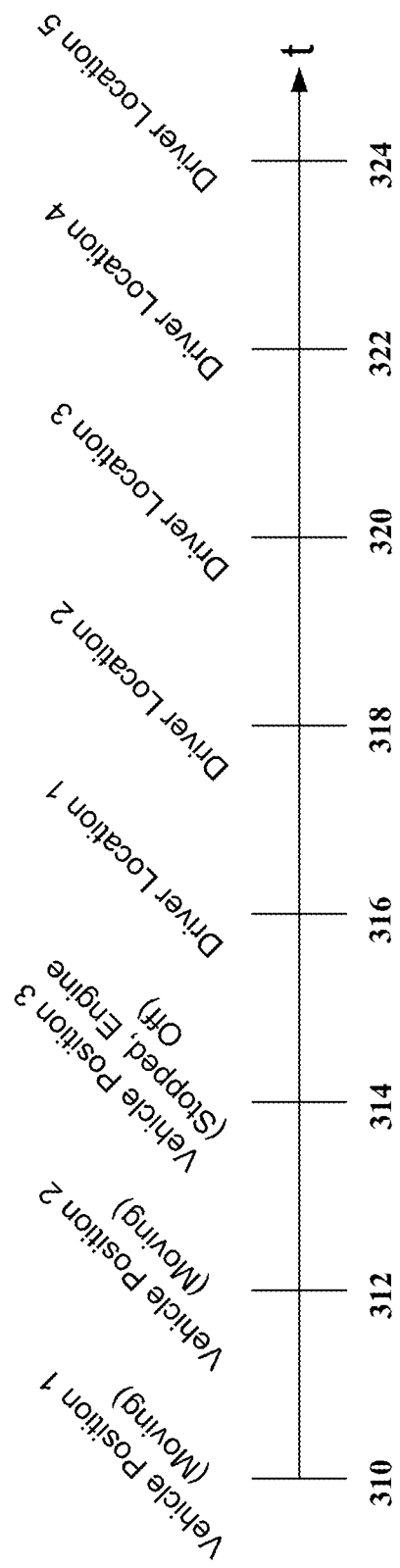
FIG. 3 illustrates timing for determining position information.

FIG. 3 illustrates timing for determining position information. Position information of the registered driver may be used to determine the shortest time in which the registered driver is in proximity to the approximate position of the vehicle. Position information is shown on a time line (labeled with time t). The times 310, 312, 314, 316, 318, 320, 322, 324 may include equal time intervals or may include unequal time intervals when the vehicle receives location information or requests location information from the registered driver. The time intervals may be predetermined intervals or based on a trigger. For example, at times 310, 312, the registered driver may be driving the vehicle, and at time 314, park the vehicle at home. At time 316, the registered driver may leave the vehicle for another location. At time 318, the registered driver may go to a scheduled meeting at work, and at time 320, leave for a business trip. At time 322, the registered driver may return to work and begin returning to the vehicle. The registered driver may reach the vehicle at time 324. After the vehicle has stopped (314), the vehicle may request the location of the registered driver. The vehicle may further determine its own location at predetermined intervals. After receiving the location of the registered driver (Driver Location 1 at time 316), the vehicle may determine the shortest time period in which the registered driver is in proximity to the vehicle. The vehicle may update the determined shortest time period after receiving subsequent locations of the registered driver (Driver Locations 2, 3, 4, 5 at times 318, 320, 322, 324, respectively). The vehicle may determine that at times 316, 318, 320 the registered driver is approximately four, six, and thirty hours away, respectively. The vehicle may determine that the system self-check process requires twenty one hours. At times 316, 318, the vehicle may determine not to initiate the system self-check process because the process may not be completed before the registered driver returns to the vehicle 110. However, at time 320, the vehicle may determine to initiate the system self-check process because the process may be completed before the registered driver returns to the vehicle 110.

FIG. 4 illustrates different types of processes. When determining whether to initiate the at least one process, the determined shortest time period may be compared to a time period to complete the at least one process. For example, in a first process type (herein referred to as a "user-approach" process 401), the time period may be a threshold time period for completing the at least one process. That is, when determining whether to initiate the at least one process, the determined shortest time period may be compared to a threshold time period for completing the at least one process. The user-approach processes may be processes that are initiated shortly before the registered driver reaches the vehicle. The user-approach processes may be initiated for the comfort of the registered driver and may be based on the registered driver preferences. For example, the registered driver may desire the vehicle cabin cooled to sixty degrees or heated to eighty degrees. As another example, the registered driver may desire the vehicle windows lowered halfway before the registered driver reaches the vehicle. As yet other example, the registered driver may desire the interior lights turned on/off, the door unlocked, and the engine/motor started one minute before the registered driver reaches the vehicle. The user-approach processes may include other processes that may be initiated shortly before the registered driver reaches the vehicle such as heating or cooling the vehicle batteries. A threshold time period may be determined based on the required amount of time necessary to initiate the at least one process. The threshold time period may be based on a preferred time. For example, the threshold time period may be 60 seconds if the registered driver would like the windows down for 60 seconds before he/she arrives to the vehicle. In another example, the vehicle may determine the threshold time period necessary to satisfy the preference. For example, to cool the cabin to sixty degrees, the vehicle may determine the threshold time period to be fifteen minutes if the current inside temperature is one hundred degrees. If the vehicle determines that the registered driver is sixty minutes away, the vehicle may sleep or wait for forty five minutes. After forty five minutes, the vehicle may recalculate the shortest time period for the registered driver to reach the vehicle based on an updated location of the registered driver. For example, the vehicle may determine the shortest time period to be ten minutes and initiate cooling the vehicle cabin to sixty eight degrees.

A second process type (herein referred to as a "selected" process 402) may include processes where one process is selected from a group. For example, the vehicle may perform system updates 405 based on the available amount of time (i.e., the shortest time period). When less time is available, the vehicle may perform incremental or urgent system updates. When more time is available, the vehicle may perform a full update. For the selected process 402, the vehicle may determine which of the processes in the group to initiate based on the shortest time period. As another example, the vehicle may charge car batteries 407 and select from one battery charge speed based on the available amount of time (the shortest time period). When more time is available, the vehicle may initiate a slower but more complete battery charge (e.g., requiring six hours). When less time is available, the vehicle may initiate a faster battery charge (e.g., requiring four hours). In this example, if the vehicle determines that the shortest time period is seven hours, the vehicle may select to initiate the slower battery charge requiring six hours.

A third process type (herein referred to as a "miscellaneous" process 403) may include all other processes not included in user-approach processes and selected processes. Miscellaneous processes may include, for example, firmware update, GPS update, software patch, security update, defragmentation, downloading data, uploading data, performing system tests, securing the vehicle, etc. With respect to securing the vehicle, if the registered drivers are not within a proximity of the vehicle, the vehicle may secure the vehicle from being entered or driven, even if a potential driver (such as a family member of one of the registered drivers) has a key. The vehicle security process may be manually overwritten through entry of a pass code. The vehicle may determine at least one process to initiate based on the shortest time period. Some processes may be performed in parallel, and some may be performed in series. The listed GPS update may be performed in parallel (e.g., simultaneously) with the other processes because the GPS function may be an independent function. The other listed processes may be performed in series. As an example, the vehicle may determine the shortest time period to be two hours. The vehicle may determine to initiate the GPS update (two hours), software patch (one hour) and download data (one hour). The three processes may be initiated even though the total process time is four hours because they are performed in parallel, with an effective wall clock time of two hours.

Some of the processes may not be initiated based on the proximity of the driver. These processes may be referred to as non-proximity processes. Non-proximity processes may be initiated as scheduled, or at any time because they were determined not to degrade the user experience or they have not been run recently and must be run even though they degrade the user experience.

Non-proximity processes include processes that a user selects should run as scheduled, despite the proximity of a registered driver. For example, referring to FIG. 4, the miscellaneous processes firmware update and defragmentation are scheduled and therefore they may be initiated based on the schedule and without constraint with respect to the proximity of a registered driver.

In addition, non-proximity processes includes processes that the registered driver determines may be initiated at any time despite the proximity of the registered driver. For example, a registered driver may determine that defragmenting a disk containing movies and music may be performed at any time and that defragmenting a disk containing an operating system may only be performed when the registered driver is at least three hours away. As such, the operating system disk defragmentation process would not be a non-proximity process, whereas the movie/music disk defragmentation process would be a non-proximity process.

Furthermore, a non-proximity process includes processes that have not been run for a while, but must be run even though they degrade the user experience. For example, if the security update process has not been run because the registered driver has been in too close a proximity for the process to be initiated, the security update process may become a non-proximity process. Once the security update process is a non-proximity process, the process may be initiated without constraints related to the proximity of a registered driver.

The processes may include a schedule of when they should run. The schedule may be a particular time at which the process should run, a frequency of running the process, and/or specific events which trigger the process. For example, the firmware update may be initiated once a week and the defragmentation process may be initiated once a day. Specific times and/or days may also be specified. The processes may be triggered by specific events. For example, the defragmentation process may be initiated upon deleting a large file or by the reduction of data stored on the disk by a specific threshold.

Figure 5:
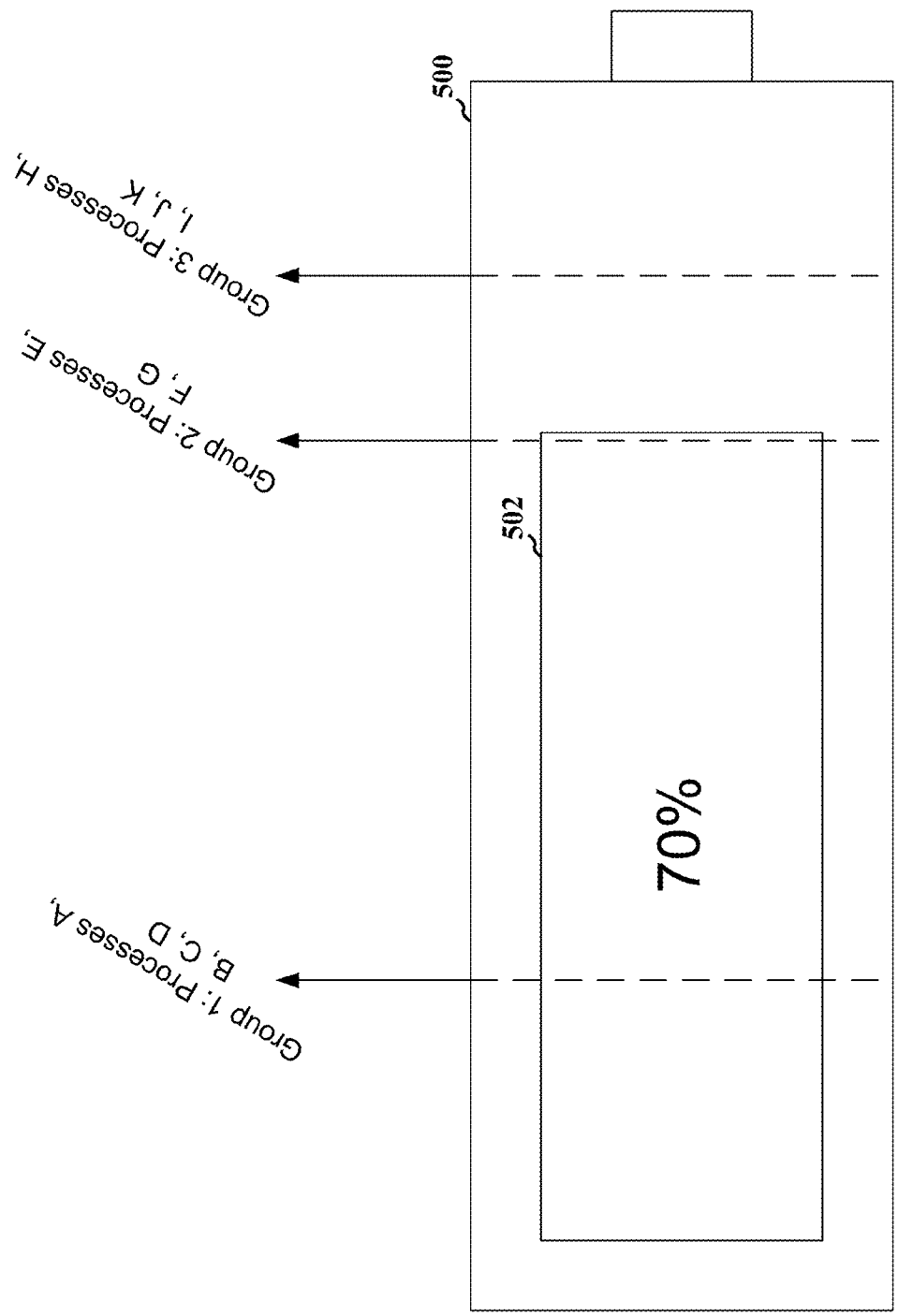
FIG. 5 illustrates determining whether to initiate at least one process based on available battery power.

FIG. 5 illustrates determining whether to initiate at least one process based on available battery power. The vehicle may have one or more power sources such as a main car battery, auxiliary battery, battery packs used to power electric motors, etc. Any or all of these power sources may be used to power the at least one process. A battery 500 shows 70% available battery power 502. Group one includes processes A, B, C, D and may be completed using less than the available power. The vehicle may determine to initiate the processes in Group one. Group two includes processes E, F, G and may be completed using all or almost all of the remaining available power. In this case, the vehicle may determine to initiate the processes if the system determines that the vehicle has sufficient battery life to power on the vehicle. The vehicle may alternatively determine not to initiate the processes because all or almost all available battery power will be depleted. The vehicle may determine an amount of battery sufficient to start the engine or motor of the vehicle to determine whether to initiate the processes. Group three includes processes H, I, J, K and may be completed using more than the available battery power 502. In this case, the system may determine not to initiate the processes of Group three. The determination to initiate the processes may be based on either or both the shortest time of travel or available battery power.

If the vehicle is connected to a power source such as an external power source including a house power outlet or a charging station, the vehicle may not need to consider available battery power 502 if using the connected power source. In such a case, Group three processes may be initiated because the battery 500 will be replenished or the power source may be the connected power source.

In some situations, Group two and Group three processes may be initiated despite there being insufficient power to start the vehicle or insufficient power to complete the processes. For example, if the vehicle is parked in the garage, but is not plugged into the charging station in the garage, the vehicle may initiate the Group two and Group three processes because the charging station is nearby. The vehicle will be unable to complete the Group three processes. However, a registered driver may plug the vehicle into the charging station to allow the Group three processes to complete. Similarly, the vehicle may be unable to start after completing the Group two processes. However, a registered driver may plug the vehicle into the charging station to allow the battery to charge during or after completion of the Group two processes.

Figure 6:
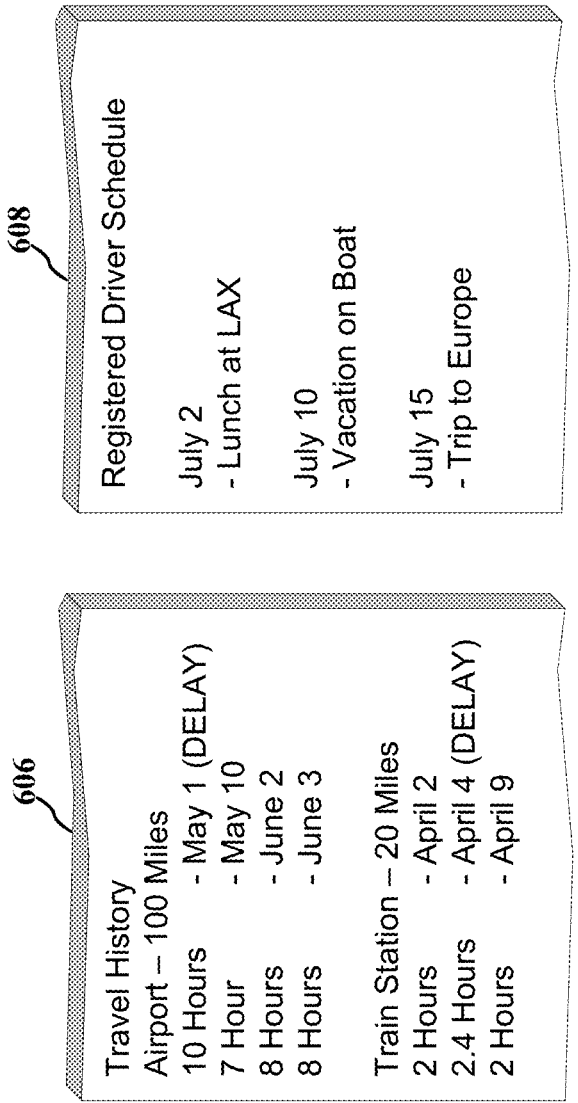
FIG. 6 illustrates information for determining whether to initiate at least one process.

FIG. 6 illustrates information used for determining whether to initiate at least one process. Information used for determining whether to initiate at least one process may include process times and process types. Information may include travel history 606 for the registered driver. The travel history may be used to calculate the time of travel for the registered driver to reach the vehicle. The vehicle may use an average or a longest historical travel time. For example, in FIG. 1, the vehicle may receive the register driver's location at the airport. The vehicle may look up the travel times in the travel history to determine that the average time from the airport is eight and a quarter hours and the longest travel time is ten hours. The vehicle may use one of the average or longest travel time in determining whether to initiate the at least one process. Information may further include a schedule 608 of the registered driver. The schedule 608 of the registered driver may be used to calculate the time of travel for the registered driver to reach the vehicle. For example, on July 2, the vehicle may look up the registered driver's schedule and determine that the registered driver has a noon time lunch appointment at the airport. The vehicle may use this location to determine the travel time and to determine whether to initiate the at least one process. As a further example, on July 10, the vehicle may determine that the registered driver is on vacation on a boat ten hours away. The vehicle may determine to initiate at least one process that completes in less than ten hours. On July 15, the vehicle may determine that the registered driver is on a trip to Europe and is twenty hours away. The vehicle may determine to initiate at least one process that is less than twenty hours.

Figure 7:
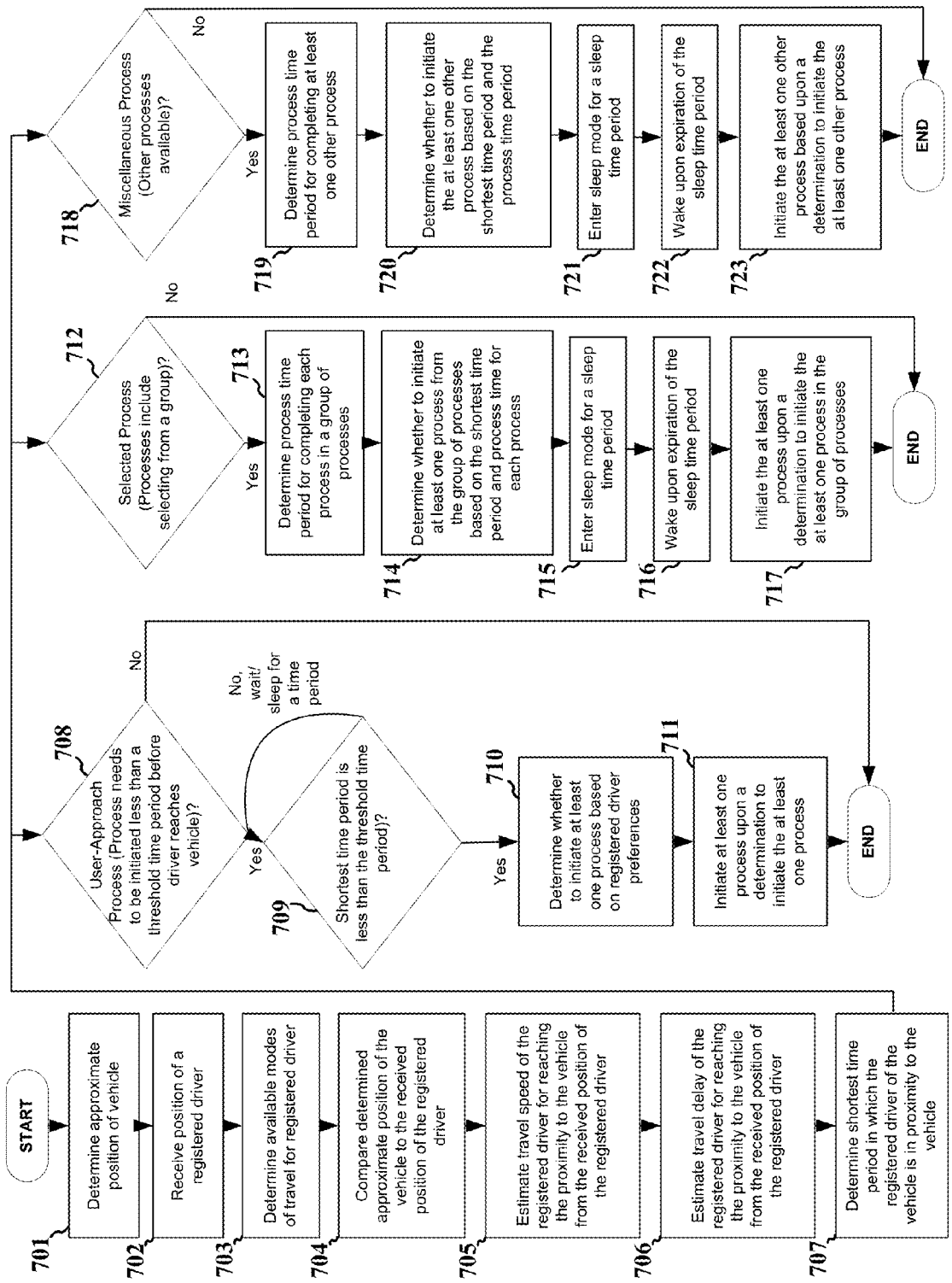
FIG. 7 is a flowchart of an exemplary embodiment.

FIG. 7 is a flowchart of an exemplary embodiment. The method may be performed by the vehicle. Starting at 701, the vehicle determines an approximate position of the vehicle. At step 702, the vehicle receives a position of the registered driver. The position of the register driver is the position of a mobile device of the registered driver that the registered driver is assumed to be carrying. At step 703, the vehicle determines available modes of travel for the registered driver. The vehicle may determine the available modes from information received from the registered driver or from information stored within the vehicle system such as the information discussed in relation to FIG. 6. At step 704, the vehicle compares the determined approximate position of the vehicle to the received position of the registered driver. At step 705, the vehicle estimates a travel speed of the registered driver for reaching the proximity of the vehicle from the received position of the registered driver. At step 706, the vehicle estimates a travel delay of the registered driver for reaching the proximity to the vehicle from the received position of the registered driver. In the steps 703, 705, 706 the vehicle may use information from the registered driver or stored information. The vehicle may also access online networks or sources in making the estimate. The travel delay may be based on inherent delays for the modes of transportation, on history, on a schedule, and/or on other available historic or real-time sources. For example, the vehicle may access real-time traffic information, flight delays, and weather conditions in determining travel delays. At step 707, the vehicle determines the shortest time period in which the registered driver of the vehicle is in proximity to the vehicle. At step 708, the vehicle determines whether there are user-approach processes (which are processes which need to be initiated less than a threshold time period before the driver reaches the vehicle) to initiate that are not non-proximity processes. For example, a user-approach process may include heating or cooling the cabin of the vehicle, tuning the radio or playing a music track, turning on or off courtesy lights, adjusting the seating or mirrors, etc. If there are such user-approach processes to initiate, the process proceeds to step 709. At step 709, the vehicle determines whether the shortest time period is less than the threshold time period. If the shortest time period is less than the threshold time period, at step 710, the vehicle determines whether to initiate at least one process based on the registered driver preferences. At step 711, the vehicle initiates at least one process upon a determination to initiate the at least one process. For example, the registered driver may be returning to the vehicle and may be less than a threshold of ten minutes away. In this case, the vehicle may heat up the cabin or tune the radio to the registered driver's preference. Returning to step 709, if the shortest time period is not less than the threshold time period (i.e., the registered driver is not less than a threshold time period away), the method may enter a wait or a sleep state.

Proceeding to step 712, the vehicle determines if there are selected processes (which are processes that include selecting from a group of processes) to initiate that are not non-proximity processes. For example, the vehicle may select from multiple battery charge speeds. When more time is available, the vehicle may initiate a slower but more complete battery charge. When less time is available, the vehicle may initiate a faster battery charge. When more time is available, the vehicle may perform more thorough and complete system updates, data synchronization, data backup, etc. When less time is available, the vehicle may perform incremental or urgent system updates. At step 713, the vehicle determines a process time period for completing each process in the group of processes. For example, slow battery charge may complete in ten hours whereas a fast charge completes in four hours. At step 714, the vehicle determines whether to initiate at least one process from the group of processes based on the shortest time period and process time for each process. At step 715, the vehicle enters sleep mode for a sleep time period. The sleep time period may be based on the difference between the shortest time period and the process time period. At step 716, the vehicle wakes upon expiration of the sleep time period. At step 717, the vehicle initiates the at least one process upon a determination to initiate the at least one process in the group of processes. Step 717 is shown following steps 715 and 716, but step 717 may precede step 715 such that the vehicle initiates the at least one process before entering the sleep mode.

Proceeding to step 718, the vehicle determines if there are miscellaneous processes to initiate that are not non-proximity processes. Miscellaneous processes are all processes other than user-approach processes and selected processes. Miscellaneous processes may include software updates, map downloads, etc. At step 719, the vehicle determines a process time period for completing the at least one other process. At step 720, the vehicle determines whether to initiate the at least one other process based on the shortest time period and the process time period. At step 721, the vehicle enters the sleep mode for a sleep time period. At step 722, the vehicle wakes upon expiration of the sleep time period. At step 723, the vehicle initiates the at least one other process based upon a determination to initiate the at least one other process.

The process groups starting at steps 708, 712, and 718 may be performed in series or in parallel. In one aspect, the method may perform the steps from 708 to 711, then the steps from 712 to 717, and then the steps from 718 to 723. In another aspect, the method may perform all three process groups simultaneously.

As discussed supra, the position of a register driver is the position of a mobile device of the registered driver that the registered driver is assumed to be carrying. If a registered driver starts the vehicle while not carrying the mobile device (i.e., while the mobile device is not in proximity to the vehicle), the vehicle may keep a record that the registered driver was not carrying the mobile device and the time. The vehicle may then determine a frequency and a likely time that the particular registered will not be carrying a mobile device. Based on the frequency and the likely time that a registered driver will not be carrying a mobile device, the vehicle may determine whether to implement the method of FIG. 7. For example, if the vehicle determines that the registered driver starts the vehicle every day at 1 p.m. without a mobile device, the vehicle may suspend the method of FIG. 7 every day a number of hours before 1 p.m. in favor of a default mode of scheduled maintenance.

Figure 8:
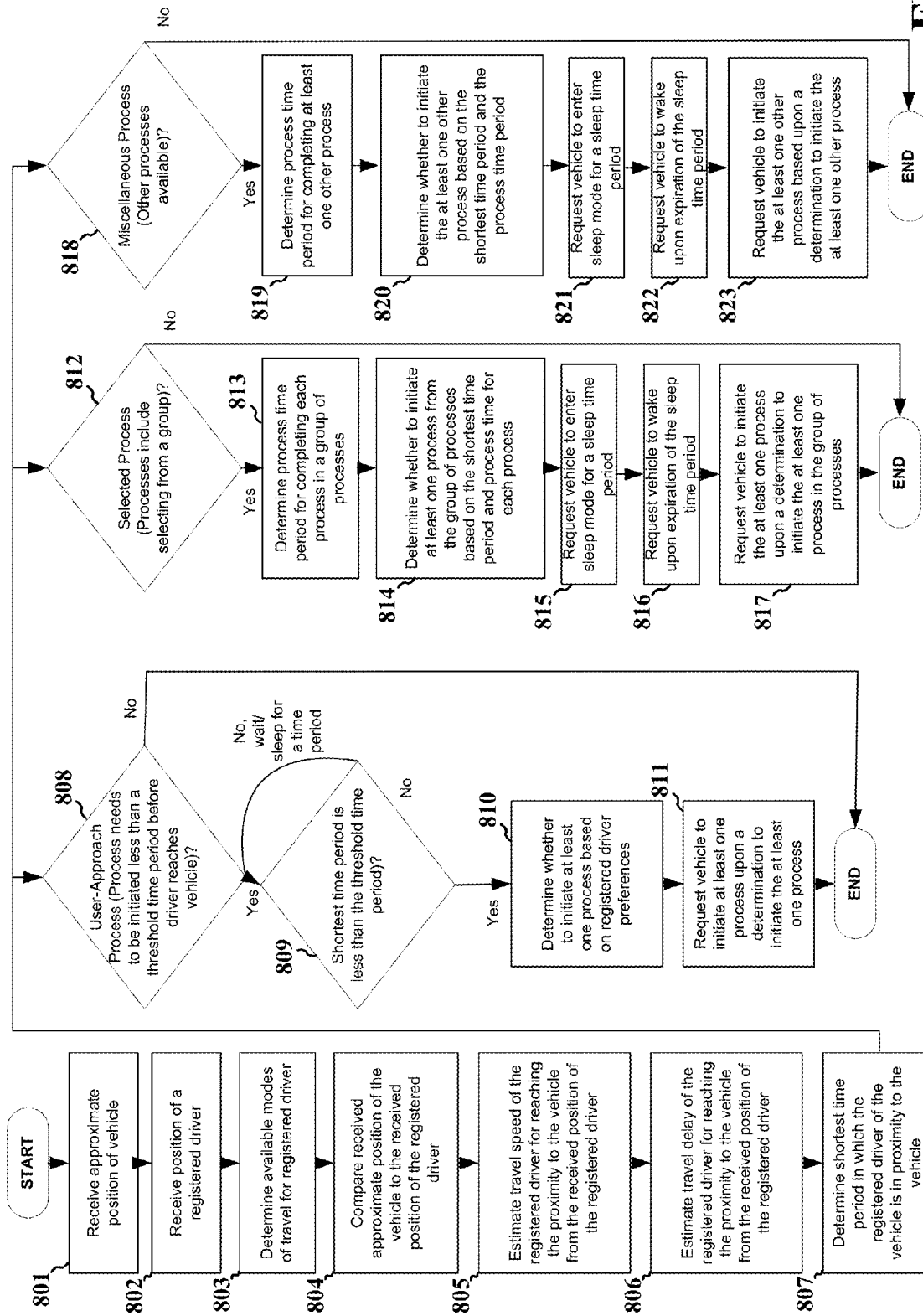
FIG. 8 is a flowchart of another exemplary embodiment.

FIG. 8 is a flowchart of another exemplary embodiment. The method may be performed by a server such as an access point. Starting at step 801, the server receives an approximate position of the vehicle. At step 802, the server receives a position of the registered driver. The position of the register driver is the position of a mobile device of the registered driver that the registered driver is assumed to be carrying. At step 803, the server determines available modes of travel for the registered driver. The server may determine the available modes from information received from the registered driver or from information stored at the server such as the information discussed in relation to FIG. 6. At step 804, the server compares the received approximate position of the vehicle to the received position of the registered driver. At step 805, the server estimates a travel speed of the registered driver for reaching the proximity of the vehicle from the received position of the registered driver. At step 806, the server estimates a travel delay of the registered driver for reaching the proximity to the vehicle from the received position of the registered driver. In the steps 803, 805, 806 the server may use information from the registered driver or stored information. The server may also access online networks or sources in making the estimate. The travel delay may be based on inherent delays for the modes of transportation, on history, on a schedule, and/or on other available historic or real-time sources. For example, the server may access real-time traffic information, flight delays, and weather conditions in determining travel delays. At step 807, the server determines the shortest time period in which the registered driver of the vehicle is in proximity to the vehicle. At step 808, the server determines whether there are user-approach processes (which are processes which need to be initiated less than a threshold time period before the driver reaches the vehicle) to initiate that are not non-proximity processes. For example, a user-approach process may include heating or cooling the cabin of the vehicle, tuning the radio or playing a music track, turning on or off courtesy lights, adjusting the seating or mirrors, etc. If there are such user-approach processes to initiate, the process proceeds to step 809. At step 809, the server determines whether the shortest time period is less than the threshold time period. If the shortest time period is less than the threshold time period, at step 810, the server determines whether to initiate at least one process based on the registered driver preferences. At step 811, the server requests the vehicle to initiate the at least one process upon a determination to initiate the at least one process. For example, the server may transmit a request through wireless communication with the vehicle. At step 815, the server requests the vehicle to enter the sleep mode for a sleep time period. At step 816, the server requests the vehicle to wake upon expiration of the sleep time period. At step 817, the server requests the vehicle to initiate the at least one process upon a determination to initiate the at least one process in the group of processes. For example, the registered driver may be returning to the vehicle and is less than a threshold of ten minutes away. In this case, the server may request the vehicle to heat up the cabin or tune the radio to the registered driver's preference. Returning to step 809, if the shortest time period is not less than the threshold time period (i.e., the registered driver is not less than a threshold time period away), the method may enter a wait or sleep state.

Proceeding to step 812, the server determines if there are selected processes (which are processes that include selecting from a group of processes) to initiate that are not non-proximity processes. For example, the server may select from multiple battery charge speeds. When more time is available, the server may request the vehicle to initiate a slower but more complete battery charge. When less time is available, the server may request the vehicle to initiate a faster battery charge. When more time is available, the server may request the vehicle to perform more thorough and complete system updates, data synchronization, data backup, etc. When less time is available, the server may request the vehicle to perform incremental or urgent system updates. At step 813, the server determines a process time period for completing each process in the group of processes. For example, slow battery charge may complete in ten hours whereas a fast charge completes in four hours. At step 814, the vehicle determines whether to initiate at least one process from the group of processes based on the shortest time period and process time for each process. At step 815, the server requests the vehicle to enter sleep mode for a sleep time period. The sleep time period may be based on the difference between the shortest time period and the process time period. At step 816, the server requests the vehicle to wake upon expiration of the sleep time period. At step 817, the server requests the vehicle to initiate the at least one process upon a determination to initiate the at least one process in the group of processes. Step 817 is shown following steps 815 and 816, but step 817 may precede step 815 such that the vehicle initiates the at least one process before entering the sleep mode.

Proceeding to step 818, the server determines if there are miscellaneous processes to initiate that are not non-proximity processes. Miscellaneous processes are all processes other than user-approach processes and selected processes. Miscellaneous processes may include software updates, map downloads, etc. At step 819, the server determines a process time period for completing the at least one other process. At step 820, the server determines whether to initiate the at least one other process based on the shortest time period and the process time period.

At step 821, the server requests the vehicle to enter the sleep mode for a sleep time period. At step 822, the server requests the vehicle to wake upon expiration of the sleep time period. At step 823, the server requests the vehicle to initiate the at least one other process based upon a determination to initiate the at least one other process. One skilled in the art will recognize that the server may request the vehicle to initiate the at least one process, and the vehicle may determine itself when to enter the sleep mode.

The process groups starting at steps 808, 812, and 818 may be performed in series or in parallel. In one aspect, the method may perform the steps from 808 to 811, then the steps from 812 to 817, and then the steps from 818 to 823. In another aspect, the method may perform all three process groups simultaneously.

As discussed supra, the position of a register driver is the position of a mobile device of the registered driver that the registered driver is assumed to be carrying. If a registered driver starts the vehicle while not carrying the mobile device (i.e., while the mobile device is not in proximity to the vehicle), the server may keep a record that the registered driver was not carrying the mobile device and the time. The server may then determine a frequency and a likely time that the particular registered will not be carrying a mobile device. Based on the frequency and the likely time that a registered driver will not be carrying a mobile device, the server may determine whether to implement the method of FIG. 8. For example, if the server determines that the registered driver starts the vehicle every day at 1 p.m. without a mobile device, the server may suspend the method of FIG. 8 every day a number of hours before 1 p.m. in favor of a default mode of scheduled maintenance.

Figure 9:
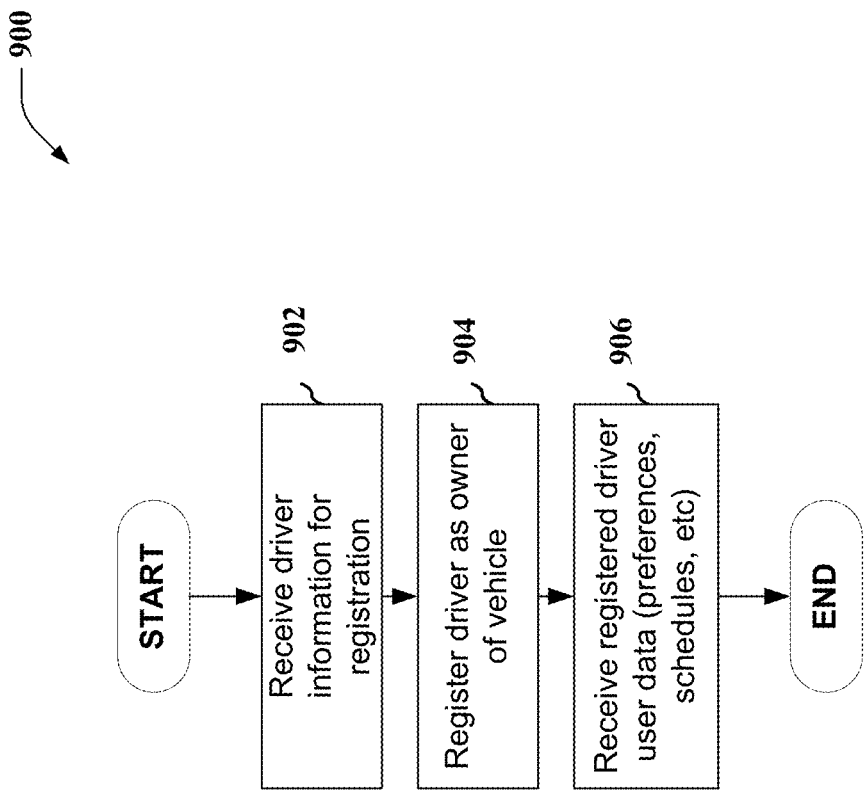
FIG. 9 is a flowchart for registering a driver with a vehicle.

FIG. 9 is a flowchart for registering the driver with the vehicle. The process starts at 902 by receiving driver information for registration. The process may be performed wirelessly, over the Internet, or at a console at the vehicle or a server. The driver information may include biographical information, a password, a token key, etc. After the process receives the driver information, the process registers the driver as the owner of the vehicle at step 904. Next at step 906, the process receives registered user data, such as preferences, schedules, etc. User data may be transmitted to the server periodically, or the vehicle or server may send a request for the user data. Once the driver is registered with the vehicle, the vehicle may receive location information for the vehicle to determine the location of the registered driver. The vehicle may further determine the shortest time period based on the user data received from the registered driver.

The vehicle and server are discussed separately and may be separate entities at remote locations. The vehicle and server may be located far apart or close together.

Figure 10:
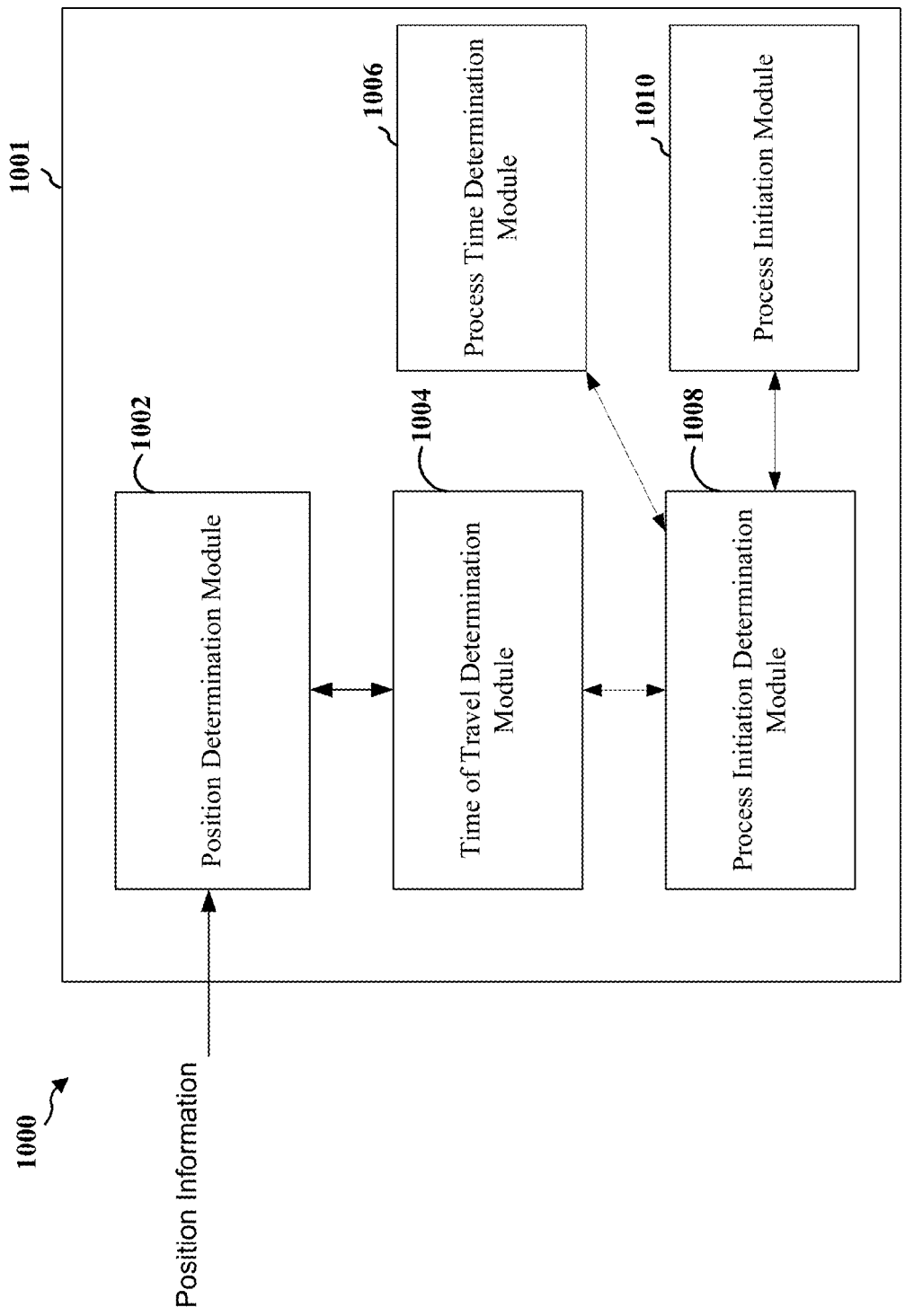
FIG. 10 is a conceptual data flow diagram illustrating the data flow between different modules/means/components in an exemplary apparatus.

FIG. 10 is a conceptual data flow diagram illustrating the data flow between different modules/means/components in an exemplary apparatus. The apparatus may be an apparatus contained within the vehicle. The apparatus 1001 may include a position determination module 1002 that is configured to receive or determine a position of the registered driver and the vehicle. The apparatus 1001 may further include a time of travel determination module 1004 that is configured to determine a time of travel based on the determined positions of the registered driver and the vehicle. The time of travel determination module 1004 may be further configured to determine the time of travel based other conditions such as schedule, time of day, history, etc. The apparatus 1001 may further include a process time determination module 1006 configured to determine the length of time a process takes to complete. The process time determination module 1006 may be configured to determine any number of processes, or group of processes. Some processes may not have a process time, or a process time that is insignificant. Other types of processes are possible. The process time determination module 1006 may determine the process time from historical information, the nature of the process, or capabilities of the system (hard drive speed, network speed, etc). Apparatus 1001 may further include a process initiation determination module 1008 configured to determine whether to initiate the at least one process. For example, the process initiation determination module 1008 may be configured to compare the time of travel and the process time. The process initiation determination module 1008 may be configured to determine to initiate the at least one process based on the location of the driver. The process initiation determination module 1008 may be configured to determine to initiate the at least one process based on many factors. For example, the determination may be based on information from a proximity sensor on either or both the vehicle and the registered driver. The apparatus 1001 may further include a process initiation module 1010. The process initiation module 1010 may be configured to initiate at least one process upon a determination of the process initiation determination module 1008 to initiate the at least one process. The process initiation module 1010 may be configured to interface with the vehicle systems in any number of ways. For example, process initiation module 1010 may be coupled to an electronic control unit (ECU), or the process initiation module 1010 may be directly connected to vehicle systems. The vehicle systems may include any electronic or mechanical systems.

The apparatus may include additional modules that perform each of the steps of the algorithm in the aforementioned flow charts of FIGS. 7, 9. As such, each step in the aforementioned flow charts FIGS. 7, 9 may be performed by a module and the apparatus may include one or more of those modules. The modules may be one or more hardware components specifically configured to carry out the stated processes/algorithm, implemented by a processor configured to perform the stated processes/algorithm, stored within a computer-readable medium for implementation by a processor, or some combination thereof.

Figure 11:
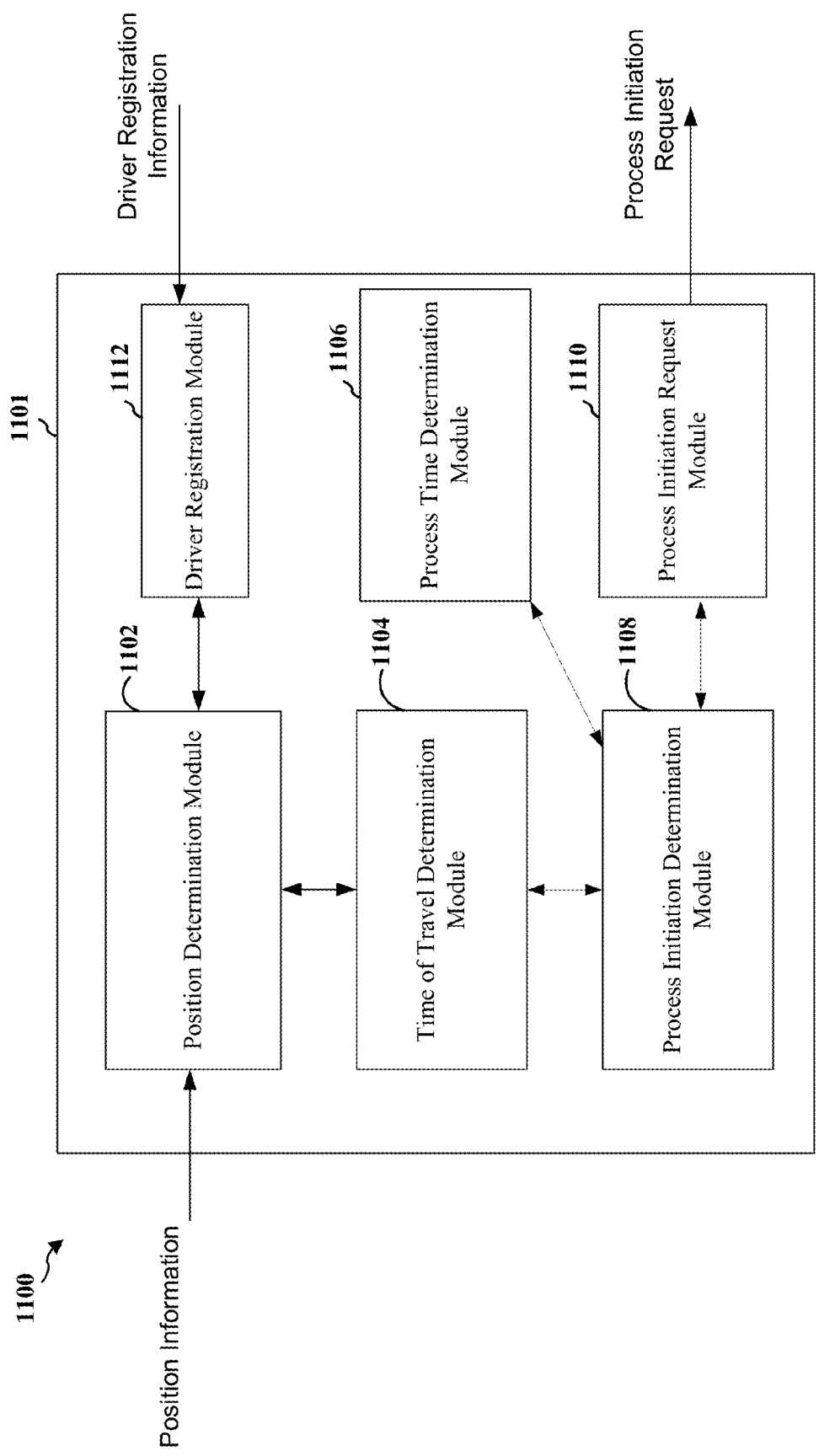
FIG. 11 is a conceptual data flow diagram illustrating the data flow between different modules/means/components in another exemplary apparatus.

FIG. 11 is a conceptual data flow diagram illustrating the data flow between different modules/means/components in another exemplary apparatus. The apparatus 1101 may be an apparatus contained within a server. The apparatus 1101 may include a driver registration module 1112 configured to receive driver registration information and to register the driver. Once the driver is registered with the system, the server may receive driver location information or request driver location information. The apparatus 1101 may include a process initiation request module 1110 for requesting a vehicle to initiate the at least one process. The process initiation request module 1110 may be coupled to a wireless device or transmitter to send a request to the vehicle for the vehicle to initiate the at least one process. The apparatus 1101 may include a position determination module 1102 that is configured to receive or determine a position of the registered driver and the vehicle. The apparatus 1101 may further include a time of travel determination module 1104 that is configured to determine a time of travel based on the determined positions of the registered driver and the vehicle. The time of travel determination module 1104 may be further configured to determine the time of travel based other conditions such as schedule, time of day, history, etc. The apparatus 1101 may further include a process time determination module 1106 configured to determine the length of time a process takes to complete. The process time determination module 1106 may be configured to determine any number of processes, or group of processes. Some processes may not have a process time, or a process time that is insignificant. Other types of processes are possible. The process time determination module 1106 may determine the process time from historical information, the nature of the process, or capabilities of the system (hard drive speed, network speed, etc). Apparatus 1101 may further include a process initiation determination module 1108 configured to determine whether to initiate the at least one process. For example, the process initiation determination module 1108 may be configured to compare the time of travel and the process time. The process initiation determination module 1108 may be configured to determine to initiate the at least one process based on the location of the driver. The process initiation determination module 1108 may be configured to determine to initiate the at least one process based on many factors. For example, the determination may be based on information from a proximity sensor on either or both the vehicle and the registered driver.

The apparatus may include additional modules that perform each of the steps of the algorithm in the aforementioned flow charts of FIGS. 8, 9. As such, each step in the aforementioned flow charts of FIGS. 8, 9 may be performed by a module and the apparatus may include one or more of those modules. The modules may be one or more hardware components specifically configured to carry out the stated processes/algorithm, implemented by a processor configured to perform the stated processes/algorithm, stored within a computer-readable medium for implementation by a processor, or some combination thereof.

Figure 12:
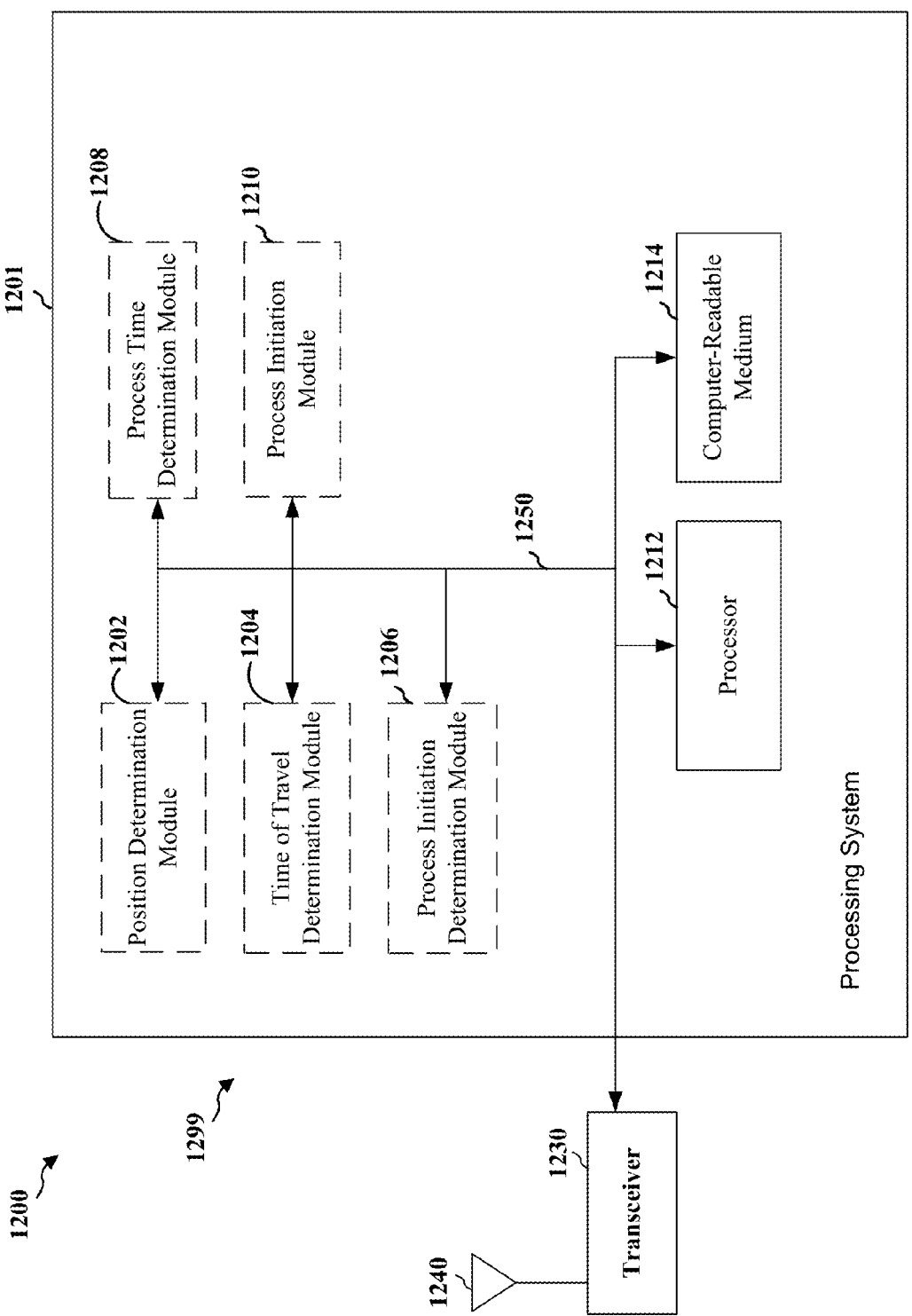
FIG. 12 is a diagram illustrating an example of a hardware implementation for an apparatus employing a processing system.

FIG. 12 is a diagram 1200 illustrating an example of a hardware implementation for an apparatus employing a processing system. The processing system may be a processing system of the vehicle. The processing system 1201 may be implemented with a bus architecture, represented generally by the bus 1250. The bus 1250 may include any number of interconnecting buses and bridges depending on the specific application of the processing system 1201 and the overall design constraints. The bus 1250 links together various circuits including one or more processors and/or hardware modules, represented by the processor 1212, the modules 1202, 1204, 1206, 1208, and 1210 and the computer-readable medium 1214. The bus 1250 may also link various other circuits such as timing sources, peripherals, voltage regulators, and power management circuits, which are well known in the art, and therefore, will not be described any further. The processing system 1201 may be linked to the vehicle systems. The processing system 1201 may be coupled to a transceiver 1230. The transceiver 1230 is coupled to one or more antennas 1240. The transceiver 1230 may provide a means for communicating with various other apparatus over a transmission medium. The processing system 1201 may include the processor 1212 coupled to the computer-readable medium 1214. The processor 1212 is responsible for general purpose processing, including the execution of software stored on the computer-readable medium 1214. The software, when executed by the processor 1212, causes the processing system 1201 to perform the various functions described supra for any particular apparatus. The computer-readable medium 1214 may also be used for storing data that is manipulated by the processor 1212 when executing software. The processing system 1201 further includes modules 1202, 1204, 1206, 1208, and 1210. The modules may be software modules running in the processor 1212, resident/stored in the computer-readable medium 1214, one or more hardware modules coupled to the processor, or some combination thereof. The processing system 1201 may be a component of the vehicle system.

In one configuration the apparatus 1001, 1299 may include means for determining an approximate position of the vehicle, means for determining a shortest time period based on the determined approximate position in which a registered driver of the vehicle is in proximity to the vehicle, and means for determining whether to initiate the at least one process within the vehicle based on the determined time period. The apparatus 1001, 1299 may further include means for receiving a position of the registered driver of the vehicle, and means for comparing the determined approximate position of the vehicle to the received position of the registered driver. The apparatus 1001, 1299 may further include means for estimating a travel speed of the registered driver for reaching the proximity to the vehicle from the received position of the registered driver, and means for estimating a travel delay of the registered driver for reaching the proximity to the vehicle from the received position of the registered driver. The apparatus 1001, 1299 may further include means for determining a process time period for completing the at least one process. The apparatus 1001, 1299 may further include means for entering into a sleep mode for a sleep time period approximately equal to the determined shortest time period minus the process time period, and means for waking upon expiration of the sleep time period in order to initiate the at least one process such that the at least one process is completed before expiration of the determined shortest time period. The apparatus 1001, 1299 may further include means for determining a position of the vehicle periodically while at least one of an engine or a motor used to propel the vehicle is turned on, means for determining a speed of charging the batteries based on the determined time period, and means for determining a remaining quantity of power in batteries of the vehicle. The apparatus 1001, 1299 may further include means for determining to initiate the at least one process despite the remaining quantity of the power in the batteries when the vehicle is within a threshold distance of a battery charging station. The apparatus 1001, 1299 may further include means for determining to initiate the at least one process despite the determined time period when the at least one process has not been initiated within a threshold time period. The apparatus 1001, 1299 may further include means for initiating the at least one process within the vehicle upon determining to initiate the at least one process. The aforementioned means may be one or more of the aforementioned modules of the apparatus 1001, 1299 and/or the processing system of the apparatus configured to perform the functions recited by the aforementioned means.

Figure 13:
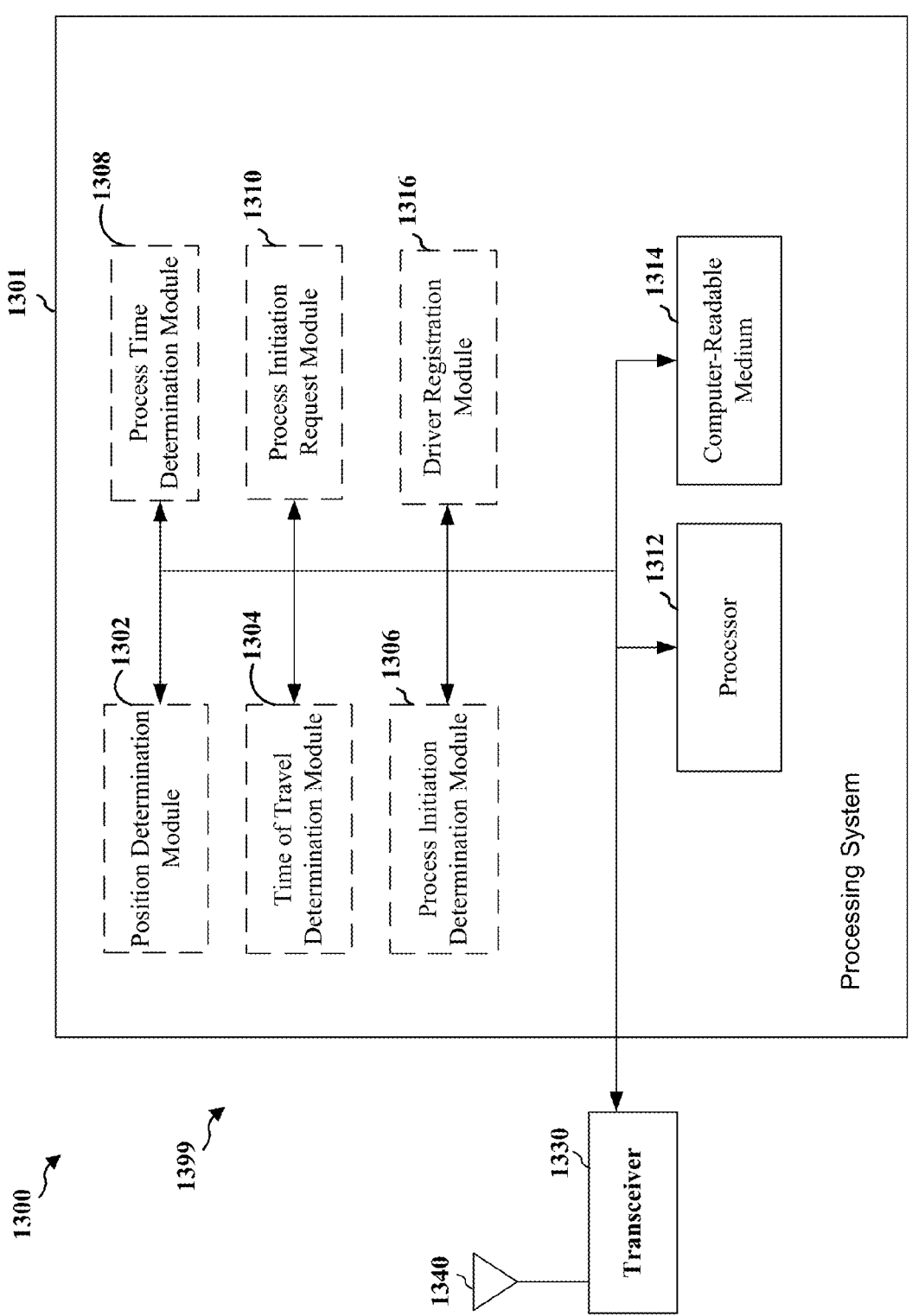
FIG. 13 is a diagram illustrating another example of a hardware implementation for another apparatus employing a processing system.

FIG. 13 is a diagram 1300 illustrating another example of a hardware implementation for an apparatus employing a processing system. The processing system may be a processing system of a server. The processing system 1301 may be implemented with a bus architecture, represented generally by the bus 1350. The bus 1350 may include any number of interconnecting buses and bridges depending on the specific application of the processing system 1301 and the overall design constraints. The bus 1350 links together various circuits including one or more processors and/or hardware modules, represented by the processor 1312, the modules 1302, 1304, 1306, 1308, and 1310 and the computer-readable medium 1314. The bus 1350 may also link various other circuits such as timing sources, peripherals, voltage regulators, and power management circuits, which are well known in the art, and therefore, will not be described any further. The processing system 1301 may be linked to the vehicle systems. The processing system 1301 may be coupled to a transceiver 1330. The transceiver 1330 is coupled to one or more antennas 1340. The transceiver 1330 may provide a means for communicating with various other apparatus over a transmission medium. The processing system 1301 may include the processor 1312 coupled to the computer-readable medium 1314. The processor 1312 is responsible for general purpose processing, including the execution of software stored on the computer-readable medium 1314. The software, when executed by the processor 1312, causes the processing system 1301 to perform the various functions described supra for any particular apparatus. The computer-readable medium 1314 may also be used for storing data that is manipulated by the processor 1312 when executing software. The processing system 1301 further includes modules 1302, 1304, 1306, 1308, and 1310. The modules may be software modules running in the processor 1312, resident/stored in the computer-readable medium 1314, one or more hardware modules coupled to the processor, or some combination thereof. The processing system 1301 may be a component of the server system.

In one configuration the apparatus 1101, 1399 may include means for determining an approximate position of the vehicle, means for determining a shortest time period based on the determined approximate position in which the registered driver of the vehicle is in proximity to the vehicle, and means for determining whether to initiate the at least one process within the vehicle based on the determined time period. The apparatus 1101, 1399 may further include means for receiving a position of the registered driver of the vehicle, and means for comparing the determined approximate position of the vehicle to the received position of the registered driver. The apparatus 1101, 1399 may further include means for estimating a travel speed of the registered driver for reaching the proximity to the vehicle from the received position of the registered driver, and means for estimating a travel delay of the registered driver for reaching the proximity to the vehicle from the received position of the registered driver. The apparatus 1101, 1399 may further include means for determining a process time period for completing the at least one process. The apparatus 1101, 1399 may further include means for entering into a sleep mode for a sleep time period approximately equal to the determined shortest time period minus the process time period, and means for waking upon expiration of the sleep time period in order to initiate the at least one process such that the at least one process is completed before expiration of the determined shortest time period. The apparatus 1101, 1399 may further include means for determining a position of the vehicle periodically while at least one of an engine or a motor used to propel the vehicle is turned on, means for determining a speed of charging the batteries based on the determined time period, and means for determining a remaining quantity of power in batteries of the vehicle. The apparatus 1001, 1399 may further include means for determining to initiate the at least one process despite the remaining quantity of the power in the batteries when the vehicle is within a threshold distance of a battery charging station. The apparatus 1001, 1399 may further include means for determining to initiate the at least one process despite the determined time period when the at least one process has not been initiated within a threshold time period. The apparatus 1101, 1399 may further include means for initiating the at least one process within the vehicle upon determining to initiate the at least one process. The aforementioned means may be one or more of the aforementioned modules of the apparatus 1101, 1399 and/or the processing system of the apparatus configured to perform the functions recited by the aforementioned means. The apparatus may further include means for requesting the vehicle to enter into a sleep mode for a sleep time period approximately equal to the determined shortest time period minus the process time period, means for requesting the vehicle to wake upon expiration of the sleep time period in order to initiate the at least one process such that the at least one process is completed before expiration of the determined shortest time period, and means for requesting the vehicle to initiate the at least one process upon determining to initiate the at least one process. The apparatus may further include means for registering the driver of the vehicle.

It is understood that the specific order or hierarchy of steps in the processes disclosed is an illustration of exemplary approaches. Based upon design preferences, it is understood that the specific order or hierarchy of steps in the processes may be rearranged. Further, some steps may be combined or omitted. The accompanying method claims present elements of the various steps in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." Unless specifically stated otherwise, the term "some" refers to one or more. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed as a means plus function unless the element is expressly recited using the phrase "means for."

What is claimed is:

1. A method for initiating at least one process in a vehicle, comprising:
    determining, using one or more processors coupled to the vehicle, an approximate position of the vehicle based on information received from one or more of a global positioning system or at least one access point;
    determining, using the one or more processors coupled to the vehicle, a shortest time period based on the determined approximate position in which a registered driver of the vehicle can reach the determined approximate position;
    determining, using the one or more processors coupled to the vehicle, to initiate the at least one process within the vehicle when a process time period for completing the at least one process is less than the determined shortest time period; and
    delaying, using the one or more processors coupled to the vehicle, initiating the at least one process within the vehicle for a sleep time period, wherein the sleep time period is determined based on a difference between the determined shortest time period and the process time period.

2. The method of claim 1, further comprising receiving a position of the registered driver of the vehicle, wherein the determining the shortest time period comprises comparing the determined approximate position of the vehicle to the received position of the registered driver.

3. The method of claim 2, wherein the registered driver of the vehicle is a driver registered with a server, and the position of the registered driver is received from the server.

4. The method of claim 2, further comprising registering a driver of the vehicle, wherein the position of the registered driver is received from a wireless device with the registered driver.

5. The method of claim 2, wherein the position of the registered driver is received at predetermined time intervals.

6. The method of claim 2, wherein a first position of the registered driver is received upon a predetermined period of time after a last approximate position of the vehicle is determined.

7. The method of claim 2, further comprising estimating a travel speed of the registered driver for reaching the determined approximate position of the vehicle from the received position of the registered driver, wherein the shortest time period is determined further based on the estimated travel speed of the registered driver.

8. The method of claim 7, wherein the travel speed of the registered driver is estimated based on at least one of (i) available modes of travel; (ii) whether traveling by land, water, or air; (iii) traffic; (iv) inherent delays associated with the available modes of travel; or (v) previous travel speed history of the registered driver.

9. The method of claim 2, further comprising estimating a travel delay of the registered driver for reaching the determined approximate position of the vehicle from the received position of the registered driver, wherein the shortest time period is determined further based on the estimated travel delay of the registered driver.

10. The method of claim 9, wherein the travel delay of the registered driver is estimated based on at least one of (i) a time of day, (ii) a schedule of the registered driver, or (iii) previous travel delay history of the registered driver.

11. The method of claim 1, further comprising determining the process time period for completing the at least one process.

12. The method of claim 1, wherein the delaying initiating the at least one process comprises:
    entering into a sleep mode for the sleep time period approximately equal to the determined shortest time period minus the process time period; and
    waking upon expiration of the sleep time period in order to initiate the at least one process such that the at least one process is completed before expiration of the determined shortest time period.

13. The method of claim 1, wherein the delaying initiating the at least one process comprises:
    requesting the vehicle to enter into a sleep mode for the sleep time period approximately equal to the determined shortest time period minus the process time period; and
    requesting the vehicle to wake upon expiration of the sleep time period in order to initiate the at least one process such that the at least one process is completed before expiration of the determined shortest time period.

14. The method of claim 1, wherein the at least one process comprises at least one of heating at least one of an engine or a motor of the vehicle, heating batteries of the vehicle, heating or cooling an interior of the vehicle, charging the batteries of the vehicle, locking doors or compartments of the vehicle, turning off lights of the vehicle, downloading data, uploading data, defragmenting memory in the vehicle, synchronizing data, or performing system tests.

15. The method of claim 1, wherein the at least one process comprises heating or cooling an interior of the vehicle and selecting a heating or cooling profile based on a user preference of the registered driver.

16. The method of claim 1, wherein the approximate position of the vehicle is a stopped position of the vehicle determined upon at least one of an engine or a motor used to propel the vehicle being turned off.

17. The method of claim 1, further comprising determining a position of the vehicle periodically while at least one of an engine or a motor used to propel the vehicle is turned on, wherein the approximate position of the vehicle is the position of the vehicle determined immediately before the at least one of the engine and the motor of the vehicle is turned off.

18. The method of claim 1, wherein the at least one process comprises charging batteries of the vehicle, and the method further comprises determining a speed of charging the batteries based on the determined time period.

19. The method of claim 1, further comprising determining a remaining quantity of power in batteries of the vehicle, wherein the determining to initiate the at least one process is further based on the determined remaining quantity of power in the batteries.

20. The method of claim 19, wherein the determining to initiate the at least one process is further based on whether the vehicle is within a threshold distance of a battery charging station.

21. The method of claim 20, further comprising determining to initiate the at least one process despite the remaining quantity of the power in the batteries when the vehicle is within a threshold distance of a battery charging station.

22. The method of claim 1, further comprising initiating the at least one process within the vehicle.

23. The method of claim 1, further comprising requesting the vehicle to initiate the at least one process.

24. The method of claim 1, wherein the determining the approximate position comprises receiving the approximate position from the vehicle.

25. The method of claim 1, wherein the calculating the shortest time period comprises:
determining an approximate position of a registered driver of said vehicle; and
determining the shortest time period of the registered driver to reach the determined approximate position of the vehicle based on the driver's location and available means of transportation.

26. The method of claim 1, further comprising:
comparing the shortest time period of the registered driver to reach the determined approximate position of the vehicle against a list of vehicle processes with designated process time periods;
initiating one of said vehicle processes if the designated process time period is less than the shortest time period of the registered driver to reach the determined approximate position of the vehicle; and
refraining from initiating one of said vehicle processes if said vehicle processes with designated process times are greater than the shortest time period of the registered driver to reach the determined approximate position of the vehicle.

27. The method of claim 1, wherein the determining initiate the at least one process within the vehicle is further based on whether the at least one process has been initiated within a threshold time period, and the method further comprises determining to initiate the at least one process despite the determined shortest time period when the at least one process has not been initiated within the threshold time period.

28. An apparatus for initiating at least one process in a vehicle, comprising:
means for determining, using one or more processors coupled to the vehicle, an approximate position of the vehicle based on information received from one or more of a global positioning system or at least one access point;
means for determining, using the one or more processors coupled to the vehicle, a shortest time period based on the determined approximate position in which a registered driver of the vehicle can reach the determined approximate position;
means for determining, using the one or more processors coupled to the vehicle, to initiate the at least one process within the vehicle when a process time period for completing the at least one process is less than the determined shortest time period; and
means for delaying, using the one or more processors coupled to the vehicle, initiating the at least one process within the vehicle for a sleep time period, wherein the sleep time period is determined based on a difference between the determined shortest time period and the process time period.

29. The apparatus of claim 28, further comprising means for receiving a position of the registered driver of the vehicle, wherein the means for determining the shortest time period is further configured to compare the determined approximate position of the vehicle to the received position of the registered driver.

30. The apparatus of claim 29, wherein the registered driver of the vehicle is a driver registered with a server, and the position of the registered driver is received from the server.

31. The apparatus of claim 29, further comprising means for registering a driver of the vehicle, wherein the position of the registered driver is received from a wireless device with the registered driver.

32. The apparatus of claim 29, wherein the position of the registered driver is received at predetermined time intervals.

33. The apparatus of claim 29, wherein a first position of the registered driver is received upon a predetermined period of time after a last approximate position of the vehicle is determined.

34. The apparatus of claim 29, further comprising means for estimating a travel speed of the registered driver for reaching the determined approximate position of the vehicle from the received position of the registered driver, wherein the shortest time period is determined further based on the estimated travel speed of the registered driver.

35. The apparatus of claim 34, wherein the travel speed of the registered driver is estimated based on at least one of (i) available modes of travel; (ii) whether traveling by land, water, or air; (iii) traffic; (iv) inherent delays associated with the available modes of travel; or (v) previous travel speed history of the registered driver.

36. The apparatus of claim 29, further comprising means for estimating a travel delay of the registered driver for reaching the determined approximate position of the vehicle from the received position of the registered driver, wherein the shortest time period is determined further based on the estimated travel delay of the registered driver.

37. The apparatus of claim 36, wherein the travel delay of the registered driver is estimated based on at least one of (i) a time of day, (ii) a schedule of the registered driver, or (iii) previous travel delay history of the registered driver.

38. The apparatus of claim 28, further comprising means for determining the process time period for completing the at least one process.

39. The apparatus of claim 28, wherein the means for delaying initiating the at least one process is configured to:
enter into a sleep mode for the sleep time period approximately equal to the determined shortest time period minus the process time period; and
wake upon expiration of the sleep time period in order to initiate the at least one process such that the at least one process is completed before expiration of the determined shortest time period.

40. The apparatus of claim 28, wherein the means for delaying initiating the at least one process is configured to:
request the vehicle to enter into a sleep mode for the sleep time period approximately equal to the determined shortest time period minus the process time period; and
request the vehicle to wake upon expiration of the sleep time period in order to initiate the at least one process such that the at least one process is completed before expiration of the determined shortest time period.

41. The apparatus of claim 28, wherein the at least one process comprises at least one of heating at least one of an engine or a motor of the vehicle, heating batteries of the vehicle, heating or cooling an interior of the vehicle, charging the batteries of the vehicle, locking doors or compartments of the vehicle, turning off lights of the vehicle, downloading data, uploading data, defragmenting memory in the vehicle, synchronizing data, or performing system tests.

42. The apparatus of claim 28, wherein the at least one process comprises heating or cooling an interior of the vehicle and selecting a heating or cooling profile based on a user preference of the registered driver.

43. The apparatus of claim 28, wherein the approximate position of the vehicle is a stopped position of the vehicle determined upon at least one of an engine or a motor used to propel the vehicle being turned off.

44. The apparatus of claim 28, wherein the means for determining the position of the vehicle is further configured to determine the position of the vehicle periodically while at least one of an engine or a motor used to propel the vehicle is turned on, wherein the approximate position of the vehicle is the position of the vehicle determined immediately before the at least one of the engine and the motor of the vehicle is turned off.

45. The apparatus of claim 28, wherein the at least one process comprises charging batteries of the vehicle, and the apparatus further comprises means for determining a speed of charging the batteries based on the determined time period.

46. The apparatus of claim 28, further comprising means for determining a remaining quantity of power in batteries of the vehicle, wherein the means for determining to initiate the at least one process makes the determination further based on the determined remaining quantity of power in the batteries.

47. The apparatus of claim 46, wherein the means for determining to initiate the at least one process makes the determination further based on whether the vehicle is within a threshold distance of a battery charging station.

48. The apparatus of claim 47, further comprising means for determining to initiate the at least one process despite the remaining quantity of the power in the batteries when the vehicle is within a threshold distance of a battery charging station.

49. The apparatus of claim 28, further comprising means for initiating the at least one process within the vehicle.

50. The apparatus of claim 28, further comprising means for requesting the vehicle to initiate the at least one process.

51. The apparatus of claim 28, wherein the means for determining the approximate position is further configured to receive the approximate position from the vehicle.

52. The apparatus of claim 28, wherein the means for determining to initiate the at least one process within the vehicle makes the determination further based on whether the at least one process has been initiated within a threshold time period, and the apparatus further comprises means for determining to initiate the at least one process despite the determined shortest time period when the at least one process has not been initiated within the threshold time period.

53. An apparatus for initiating at least one process in a vehicle, comprising:
 a memory; and
 at least one processor coupled to the memory and the vehicle, the at least one processor configured to:
  determine an approximate position of the vehicle based on information received from one or more of a global positioning system or at least one access point;
  determine a shortest time period based on the determined approximate position in which a registered driver of the vehicle can reach the determined approximate position;
  determine to initiate the at least one process within the vehicle when a process time period for completing the at least one process is less than the determined shortest time period; and
  delay initiating the at least one process within the vehicle for a sleep time period, wherein the sleep time period is determined based on a difference between the determined shortest time period and the process time period.

54. The apparatus of claim 53, wherein the at least one processor is further configured to receive a position of the registered driver of the vehicle, wherein the determining the shortest time period comprises comparing the determined approximate position of the vehicle to the received position of the registered driver.

55. The apparatus of claim 54, wherein the registered driver of the vehicle is a driver registered with a server, and the position of the registered driver is received from the server.

56. The apparatus of claim 54, wherein the at least one processor is further configured to register a driver of the vehicle, wherein the position of the registered driver is received from a wireless device with the registered driver.

57. The apparatus of claim 54, wherein the position of the registered driver is received at predetermined time intervals.

58. The apparatus of claim 54, wherein a first position of the registered driver is received upon a predetermined period of time after a last approximate position of the vehicle is determined.

59. The apparatus of claim 54, wherein the at least one processor is further configured to estimate a travel speed of the registered driver for reaching the determined approximate position of the vehicle from the received position of the registered driver, wherein the shortest time period is determined further based on the estimated travel speed of the registered driver.

60. The apparatus of claim 59, wherein the travel speed of the registered driver is estimated based on at least one of (i) available modes of travel; (ii) whether traveling by land, water, or air; (iii) traffic; (iv) inherent delays associated with the available modes of travel; or (v) previous travel speed history of the registered driver.

61. The apparatus of claim 54, wherein the at least one processor is further configured to estimate a travel delay of the registered driver for reaching the determined approximate position of the vehicle from the received position of the registered driver, wherein the shortest time period is determined further based on the estimated travel delay of the registered driver.

62. The apparatus of claim 61, wherein the travel delay of the registered driver is estimated based on at least one of (i) a time of day, (ii) a schedule of the registered driver, or (iii) previous travel delay history of the registered driver.

63. The apparatus of claim 53, wherein the at least one processor is further configured to determine the process time period for completing the at least one process.

64. The apparatus of claim 53, wherein, to delay initiating the at least one process, the at least one processor is configured to:
 enter into a sleep mode for the sleep time period approximately equal to the determined shortest time period minus the process time period; and
 wake upon expiration of the sleep time period in order to initiate the at least one process such that the at least one process is completed before expiration of the determined shortest time period.

65. The apparatus of claim 53, wherein, to delay initiating the at least one process, the at least one processor is configured to:
request the vehicle to enter into a sleep mode for the sleep time period approximately equal to the determined shortest time period minus the process time period; and
request the vehicle to wake upon expiration of the sleep time period in order to initiate the at least one process such that the at least one process is completed before expiration of the determined shortest time period.

66. The apparatus of claim 53, wherein the at least one process comprises at least one of heating at least one of an engine or a motor of the vehicle, heating batteries of the vehicle, heating or cooling an interior of the vehicle, charging the batteries of the vehicle, locking doors or compartments of the vehicle, turning off lights of the vehicle, downloading data, uploading data, defragmenting memory in the vehicle, synchronizing data, or performing system tests.

67. The apparatus of claim 53, wherein the at least one process comprises heating or cooling an interior of the vehicle and selecting a heating or cooling profile based on a user preference of the registered driver.

68. The apparatus of claim 53, wherein the approximate position of the vehicle is a stopped position of the vehicle determined upon at least one of an engine or a motor used to propel the vehicle being turned off.

69. The apparatus of claim 53, wherein the at least one processor is further configured to determine a position of the vehicle periodically while at least one of an engine or a motor used to propel the vehicle is turned on, wherein the approximate position of the vehicle is the position of the vehicle determined immediately before the at least one of the engine and the motor of the vehicle is turned off.

70. The apparatus of claim 53, wherein the at least one process comprises charging batteries of the vehicle, and the processing system is further configured to determine a speed of charging the batteries based on the determined time period.

71. The apparatus of claim 53, wherein the at least one processor is further configured to determine a remaining quantity of power in batteries of the vehicle, wherein the processing system is configured to determine to initiate the at least one process further based on the determined remaining quantity of power in the batteries.

72. The apparatus of claim 71, wherein the at least one processor is configured to determine to initiate the at least one process further based on whether the vehicle is within a threshold distance of a battery charging station.

73. The apparatus of claim 72, wherein the at least one processor is configured to determine to initiate the at least one process despite the remaining quantity of the power in the batteries when the vehicle is within a threshold distance of a battery charging station.

74. The apparatus of claim 53, wherein the at least one processor is further configured to initiate the at least one process within the vehicle.

75. The apparatus of claim 53, wherein the at least one processor is further configured to request the vehicle to initiate the at least one process.

76. The apparatus of claim 53, wherein the at least one processor is configured to determine the approximate position by receiving the approximate position from the vehicle.

77. The apparatus of claim 53, wherein the at least one processor is configured to determine to initiate the at least one process within the vehicle further based on whether the at least one process has been initiated within a threshold time period, and the processing system is further configured to determine to initiate the at least one process despite the determined shortest time period when the at least one process has not been initiated within the threshold time period.

78. A non-transitory computer-readable medium storing computer executable code for wireless communication, comprising code for:
determining, using one or more processors coupled to a vehicle, an approximate position of the vehicle based on information received from one or more of a global positioning system or at least one access point;
determining, using the one or more processors coupled to the vehicle, a shortest time period based on the determined approximate position in which a registered driver of the vehicle can reach the determined approximate position;
determining, using the one or more processors coupled to the vehicle, to initiate the at least one process within the vehicle when a process time period for completing the at least one process is less than the determined shortest time period; and
delaying, using the one or more processors coupled to the vehicle, initiating the at least one process within the vehicle for a sleep time period, wherein the sleep time period is determined based on a difference between the determined shortest time period and the process time period.

* * * * *